(12) United States Patent
Van Aert et al.

(10) Patent No.: US 12,180,375 B2
(45) Date of Patent: *Dec. 31, 2024

(54) AQUEOUS CATIONIC POLYURETHANE DISPERSIONS

(71) Applicant: AGFA NV, Mortsel (BE)

(72) Inventors: Hubertus Van Aert, Mortsel (BE); Johan Loccufier, Mortsel (BE); Marie Lehericey, Mortsel (BE); Mei-Yuan Hsu, Mortsel (BE)

(73) Assignee: Agfa NV, Mortsel (BE)

( * ) Notice: Subject to any disclaimer, the term of this patent is extended or adjusted under 35 U.S.C. 154(b) by 441 days.

This patent is subject to a terminal disclaimer.

(21) Appl. No.: 17/628,974

(22) PCT Filed: Jul. 16, 2020

(86) PCT No.: PCT/EP2020/070140
§ 371 (c)(1),
(2) Date: Jan. 21, 2022

(87) PCT Pub. No.: WO2021/013690
PCT Pub. Date: Jan. 28, 2021

(65) Prior Publication Data
US 2022/0259448 A1 Aug. 18, 2022

(30) Foreign Application Priority Data

Jul. 25, 2019 (EP) .................................. 19188256

(51) Int. Cl.
*C09D 11/102* (2014.01)
*B41M 5/00* (2006.01)
(Continued)

(52) U.S. Cl.
CPC .......... *C09D 11/102* (2013.01); *B41M 5/0017* (2013.01); *B41M 5/0023* (2013.01); *C08G 18/0814* (2013.01); *C08G 18/12* (2013.01); *C08G 18/222* (2013.01); *C08G 18/227* (2013.01); *C08G 18/3206* (2013.01);
(Continued)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023;
(Continued)

(56) References Cited

U.S. PATENT DOCUMENTS

| | | |
|---|---|---|
| 3,686,108 A | 8/1972 | Reiff et al. |
| 7,964,665 B2 | 6/2011 | Nagao et al. |

(Continued)

FOREIGN PATENT DOCUMENTS

| | | |
|---|---|---|
| CN | 108570281 A | 9/2018 |
| EP | 1879938 B1 | 4/2012 |

(Continued)

OTHER PUBLICATIONS

European Patent Office, International Search Report in International Patent Application No. PCT/EP2020/070140, mailed Oct. 9, 2020, 4 pp.
European Patent Office, Written Opinion in International Patent Application No. PCT/EP2020/070140, mailed Oct. 9, 2020, 7 pp.
Fock et al., "Polyether-1,2- and -1,3-diols as macromonomers for the synthesis of graft copolymers, 1. Synthesis and characterization of the macromonomers," *Makromol. Chem.*, 191: 3045-3057 (1990).

*Primary Examiner* — Manish S Shah
(74) *Attorney, Agent, or Firm* — Leydig, Voit & Mayer, Ltd.

(57) ABSTRACT

An aqueous polyurethane resin dispersion, the polyurethane resin having a cationic group and a polyalkylene oxide in a side chain thereof and is obtainable by reacting a polyisocyanate with a polyether diol and with a polymeric diol such as a polyester diol, polyether diol, polycarbonate diol, polyacrylate diol or polyolefin diol and with a cationic polyol selected from the group consisting of an quaternary ammonium, a quaternary phosphonium, a tertiary sulfonium and a iodonium wherein the cationic polyol comprises at least two hydroxyl groups and has a total number of carbon atoms making up the carbon chains between the cationic charged atom and a hetero atom or end of the carbon chain of the cation over charge ratio of at least 12. The aqueous dispersion can be used in treatment liquids for inkjet printing and in inkjet inks.

17 Claims, No Drawings

(51) Int. Cl.
*C08G 18/08* (2006.01)
*C08G 18/12* (2006.01)
*C08G 18/22* (2006.01)
*C08G 18/32* (2006.01)
*C08G 18/40* (2006.01)
*C08G 18/42* (2006.01)
*C08G 18/48* (2006.01)
*C08G 18/66* (2006.01)
*C08G 18/75* (2006.01)
*C09D 11/322* (2014.01)
*C09D 11/38* (2014.01)
*C09D 11/54* (2014.01)

(52) U.S. Cl.
CPC ....... *C08G 18/3275* (2013.01); *C08G 18/329* (2013.01); *C08G 18/4018* (2013.01); *C08G 18/4213* (2013.01); *C08G 18/4833* (2013.01); *C08G 18/6622* (2013.01); *C08G 18/6688* (2013.01); *C08G 18/755* (2013.01); *C09D 11/322* (2013.01); *C09D 11/38* (2013.01); *C09D 11/54* (2013.01)

(58) Field of Classification Search
CPC .... B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2006/0067907 | A1* | 3/2006 | Mougin | A61K 8/81 424/70.17 |
| 2008/0090949 | A1* | 4/2008 | Nagao | C08G 18/4202 524/401 |
| 2015/0299948 | A1* | 10/2015 | Pan | D06P 5/30 524/591 |
| 2017/0022379 | A1* | 1/2017 | Loccufier | C09D 11/104 |
| 2017/0029637 | A1* | 2/2017 | Loccufier | C09D 11/328 |
| 2017/0029639 | A1* | 2/2017 | Loccufier | B01J 13/06 |
| 2017/0218565 | A1* | 8/2017 | Loccufier | D06P 1/44 |
| 2019/0016911 | A1* | 1/2019 | Okamoto | B41M 5/00 |
| 2019/0367760 | A1* | 12/2019 | Loccufier | B41M 5/0047 |
| 2019/0367761 | A1* | 12/2019 | Loccufier | B41M 7/009 |
| 2019/0367762 | A1* | 12/2019 | Loccufier | C09D 11/037 |

FOREIGN PATENT DOCUMENTS

| | | | |
|---|---|---|---|
| EP | 3351603 A1 | 7/2018 | |
| JP | 2005-264149 A | 9/2005 | |
| JP | 2009-237174 A | 10/2009 | |
| WO | WO-2018137993 A1 * | 8/2018 | ............. B01J 13/14 |
| WO | WO 2019/105786 A1 | 6/2019 | |

* cited by examiner

AQUEOUS CATIONIC POLYURETHANE DISPERSIONS

CROSS-REFERENCE TO RELATED APPLICATIONS

This application is the U.S. national phase of copending International Patent Application No. PCT/EP2020/070140, filed Jul. 16, 2020, which claims the benefit of European Patent Application No. 19188256.2, filed Jul. 25, 2019.

TECHNICAL FIELD

The present invention relates to an aqueous polyurethane resin dispersion and more specifically to the use of the polyurethane resin in treatment liquids of substrates for ink jet printing with aqueous ink jet inks or in aqueous inkjet inks.

BACKGROUND ART

Aqueous cationic polyurethane dispersions are usually produced by incorporating tertiary amino diols or polyols which can be quaternized by protonation or reaction with an alkyl halide or alkaryl halide.

In the first case, the synthesis required two steps and the cationic character of the polyurethane dispersion is pH dependent. An increase of the pH of the aqueous medium will lead to a deprotonation and loss of cationic character of the dispersion and the polyurethane resin. This happens for example in ink jet printing where the substrate (e.g. paper or a textile fabric) is first treated with an aqueous cationic PU-dispersion to fix the colorants of the inks applied subsequently onto the substrate. However, the inks may have a neutral or alkaline pH and so leading to a decrease of the cationic character of the polyurethane binder on the substrate and hence a decrease in fixing power of the colorants.

In the second case, quaternized amino diols have the disadvantage that the solubility in typical solvents used for the polyurethane synthesis such as acetone, acetonitrile or dioxolane is poor which requires the use of solvents having a high boiling point such as NMP, DMF, DMA, NEP, DMSO, sulpholane, TOU, Dipropylene glycol dimethyl ether. The presence of these solvents make it very hard to obtain aqueous cationic polyurethane dispersions free of solvents as they cannot be easily removed by distillation.

JP2009237174 discloses polymers made from quaternized amino diols, the polymers are prepared and used in organic solvents.

Another possibility to obtain aqueous cationic polyurethane dispersions which cationic character is not pH dependent, is to quaternize the amino groups after the polyurethane synthesis has been performed as disclosed in U.S. Pat. Nos. 3,686,108 and 7,964,665B2. This quaternization has to be done with reagents such as methyl sulphate or benzyl chloride which are toxic and due to the fact that the quaternisation is incomplete, have to be removed from the aqueous dispersion.

From the above, it is clear that a synthesis method for aqueous polyurethane dispersions, the cationic character not being pH dependent, is still required and which does not require the use of organic solvents having a high boiling point or a purification process.

SUMMARY OF INVENTION

It is an objective of the invention to provide a solution for the above stated problems. The objective has been achieved by introducing cationic diols as defined in claim 1

According to another aspect, the present invention includes a treatment liquid for inkjet recording, the treatment liquid includes the aqueous dispersion as defined in claim 1. The treatment liquid is defined in claim 3.

According to another aspect, the present invention includes an inkjet ink including the aqueous dispersion as defined in claim 1. The inkjet ink is defined in claim 7.

According to another aspect, the present invention includes an inkjet recording method using the polyurethane resin as defined in claim 1. This method is defined in claim 9.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Aqueous Polyurethane Resin Dispersion

A.1. Polyurethane Resin

The polyurethane resin of the aqueous dispersion according to the invention is characterised by the fact that the polyurethane resin comprises a cationic group in the main chain or in a side chain and a polyalkylene oxide also being present in a side chain of the urethane backbone. Both the cationic group and the polyalkylene oxide increase the dispersibility and colloidal stability of the dispersed resin in water. The polyurethane resin of the invention is obtainable by reacting a polyol containing a cationic group, a polyether diol, a polymeric diol and a polyisocyanate.

A.1.1. Polyols Containing a Cationic Group

Suitable polyols for obtaining the aqueous dispersion according to the invention are cationic polyols selected from the group consisting of a quaternary ammonium, a quaternary phosphonium, a tertiary sulfonium and a iodonium wherein the cationic polyol comprises at least two hydroxyl groups and has a total number of carbon atoms making up the carbon chains between the cationic charged atom and a hetero atom or end of the carbon chains of the cation over charge ratio of at least 12. The incorporation of the above described polyols lead to a 'strong' cationic character of the PU-resin which will give a good fixation power towards colorants in aqueous inkjet inks when used in pre-treatments of substrates.

The above mentioned term 'quaternary' means that 4 carbon atoms are connected to the nitrogen or phosphor atom. The above mentioned term 'tertiary' means that 3 carbon atoms are connected to the sulfur atom.

Preferably the polyol comprises a quaternized ammonium group. More preferably the polyol comprising the quaternized ammonium groups is a diol.

Suitable cationic polyols selected from the group consisting of a quaternary ammonium, a quaternary phosphonium, a tertiary sulfonium and a iodonium wherein the cationic polyol comprises at least two hydroxyl groups and has a total number of carbon atoms making up the carbon chains between the cationic charged atom and a hetero atom or end of the carbon chains of the cation over charge ratio of at least 12, are tabulated in Table 1.

TABLE 1

| Structure | Nr |
|---|---|
| (structure) | P-1 |
| (structure) | P-2 |
| (structure) | P-3 |
| (structure) | P-4 |
| (structure) | P-5 |
| (structure) | P-7 |
| (structure) | P-8 |
| (structure) | P-9 |
| (structure) | P-10 |
| (structure) | P-11 |

TABLE 1-continued

| Structure | Nr |
|---|---|
| (structure) | P-12 |
| (structure) | P-13 |
| (structure) | P-14 |
| (structure) | P-15 |
| (structure) | P-16 |
| (structure) | P-17 |
| (structure) | P-18 |
| (structure) | P-19 |
| (structure) | P-20 |
| (structure) | P-21 |

More preferably, the polyol containing a cationic group is according to Formula I

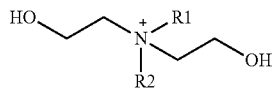

Formula I wherein R1 is a substituted alkyl or alkaryl group
R2 is a substituted aryl or alkyl group having at least 7 carbon atoms or the number of carbons of R1 and R2 together is at least 8

In another preferred embodiment, the polyol containing a cationic group is according to Formula II:

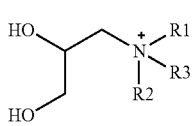

Formula II

Wherein R1 and R2 have the same meaning as in Formula I; and
R3 is a substituted alkyl or aryl group.

A.1.2. Polyether Diol

The polyether diol is preferably a 1,2-1,3 polyether diol. 1,2-1,3 polyether diols can be synthesized by alkoxylation of cyclic hydroxy-functional ketals derived from alcohols with at least three hydroxy groups. Afterwards the ketal can be converted into the diol under acidic conditions.

Examples of useful ketals are: 5-ethyl-2,2-dimethyl-1,3-dioxane-5-methanol, CAS Registry Number 20761-68-6, 2,2-dimethyl-1,3-dioxane-5-methanol, CAS Registry Number 4728-12-5, 2,2,5-trimethyl-1,3-dioxane-5-methanol, CAS Registry Number 3663-46-5, 2,2-dimethyl-1,3-dioxane-5,5-dimethanol, CAS Registry Number 770-74-1, 2,2-dimethyl-1,3-dioxolane-4-methanol, CAS Registry Number 100-79-8.

Alternatively, to the use hydroxyl functional ketals, one can use also oxetanes, but these are less stable upon alkoxylation, examples are e.g. 3-methyl-3-oxetanemethanol, CAS Registry Number 3143-02-0 or 3-ethyl-3-oxetanemethanol=trimethylolpropane oxetane, CAS Registry Number 3047-32-3

Preferred polyether diols are compounds according to Formula Ill.

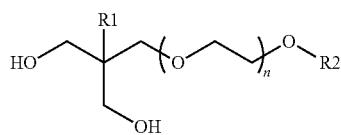

Formula III wherein R1 is methyl or ethyl, R2 is H or $C_1$-$C_4$ alkyl and n represents an integer from 5 to 50, more preferably from 10 to 40 and most preferably from 15 to 30.

The polyether diol which can be preferably used in the present invention, is Ymer N120 or Tegomer D 3403, i.e. α-[2,2-bis(hydroxymethyl)butyl]-ω-methoxy-Poly(oxy-1,2-ethanediyl). These diols can be prepared from 5-ethyl-2,2-dimethyl-1,3-dioxane-5-methanol, CAS Registry Number 20761-68-6 or 3-ethyl-3-oxetanemethanol=trimethylolpropane oxetane, CAS Registry Number 3047-32-3.

A possible synthesis procedure is described by Fock, J.; Möhring, V., Polyether-1,2- and -1,3-diols as macromonomers for the synthesis of graft copolymers, 1. Synthesis and characterization of the macromonomers. Die Makromolekulare Chemie 1990, 191 (12), 3045-3057.

Ymer N120 or Tegomer D 3403 are known under CAS registry number 131483-27-7, ie. α-[2,2-bis(hydroxymethyl)butyl]-ω-methoxy-poly(oxy-1,2-ethanediyl).

In general, also other polyether 1,2- or 1,3-diols can be used. For a good stability the polyether graft needs to be well water soluble in order to give a good steric stabilisation. In the case of Ymer N120 the polyether is only composed of ethylene oxide segments, but this can also be a copolymer of different alkylene oxides. Furthermore, in the current macromonomer diol the end group is a methoxy group, this end group can also be other end groups such as a hydrophilic end group (such as anionic groups, e.g. carboxylic, sulphate, phosphate, etc. or cationic groups, e.g. quaternary amine groups or precursors for cationic groups e.g. tertiary amino groups) in order to have also electro-steric stabilisation.

The content of the polyether diol in the polyurethane resin is preferably 30 wt. % or less, but more than 1 wt. % with respect to the total solid weight of the polyurethane resin, more preferably the polyether diol content is equal to or less than 15 wt. % and more than 2 wt. % with respect to the polyurethane resin. A content of the polyether diol of less than 30 wt. %, but more than 1 wt. % with respect to the polyurethane resin, has an additional improvement in scratch resistance and solvent resistance of the jetted and dried image with respect to polyether diol content outside this range. Too high polyether diol content (more than 30 wt %) would lead to a too high water solubility and lower glass transition temperature.

A.1.3. Polyisocyanates

Specific examples of the organic polyisocyanate compound that is reacted with the polyester polyol include aliphatic diisocyanates such as lysine diisocyanate, hexamethylene diisocyanate and trimethylhexane diisocyanate; cyclic aliphatic diisocyanates such as hydrogenated xylene diisocyanate, isophorone diisocyanate, methylcyclohexane-2, 4 (or 2,6)-diisocyanate, 4,4'-methylenebis(cyclohexyl isocyanate) and 1,3-(isocyanatomethyl)cyclohexane; aromatic diisocyanates such as tolylene diisocyanate, xylene diisocyanate and diphenylmethane diisocyanate; organic polyisocyanates themselves, including tri- or higher-valent polyisocyanates such as lysine triisocyanate; adducts each composed of such an organic polyisocyanate with a polyhydric alcohol, a low molecular weight polyester resin or hydrogen; and cyclised polymers (for example, isocyanurate), biuret type adducts and the like, each formed from various diisocyanate compounds mentioned above.

It is preferable, from the viewpoint of storage stability of the treatment liquid composition, that the organic polyisocyanate compound according to the invention include at least one selected from non-yellowing type polyisocyanate compounds such as isophorone diisocyanate, hexamethylene diisocyanate and lysine diisocyanate, and it is more preferable that the organic polyisocyanate compound include at least isophorone diisocyanate.

Furthermore, the organic polyisocyanate compounds can be used singly alone or as mixtures of two or more kinds.

A.1.4. Polymeric Dials

During the reaction between the polyol comprising a cationic group, the polyether polyol and the polyisocyanate, polymeric dials can be present. Preferred polymeric dials include polycarbonate dials, polyether dials, polyacrylate dials, aliphatic polyester dials, polyolefin dials. More preferred dials are polyester diol, obtained by reacting a polycarboxylic acid and a polyol.

Most preferably, the polyester dial is a resin formed by an esterification reaction or transesterification reaction between at least one aromatic polycarboxylic acid component and at least one polyol component. Specific examples of the aromatic polycarboxylic acid include dibasic acids such as phthalic acid, isophthalic acid, terephthalic acid, 2,6-Naphthalenedicarboxylic acid, 1,4-naphthalenedicarboxylic acid, 1,5-naphthalenedicarboxylic acid; tri- or higher-valent polybasic acids such as trimellitic acid and pyromellitic acid; and acid anhydrides thereof, for example, phthalic anhydride, trimellitic anhydride, pyromellitic anhydride; and the like. As the aromatic polycarboxylic acid component, one or more dibasic acids selected from the dibasic acids mentioned above, lower alkyl ester compounds of these acids, and acid anhydrides are mainly used. If necessary, a monobasic acid such as benzoic acid, crotonic acid or p-t-butyl benzoic acid; a tri- or higher valent polycarboxylic acid such as trimellitic anhydride, methylcyclohexene tricarboxylic acid or pyromellitic anhydride; or the like can be further used in combination with the polycarboxylic acid component. It is preferred that the polyester is prepared using dicarboxylic acids which give linear polymer chains, in particular 1,4-terephthalic acid copolymers give a better performance regarding colloidal stability in aqueous medium, than phthalic acid anhydride copolymers. Besides terephthalic acids, one could use also other para- or linear substituted polycarboxylic acids to obtain the desired properties such as 2,6-naphthalenedicarboxylic acid or 1,5-naphthalenedicarboxylic acid.

The preferred carboxylic acid is an aromatic dicarboxylic acid such as terephthalic acid and isophthalic acid. The content of aromatic acids within the resin is equal to or higher than 30 mol % and preferably equal to or higher than 50 mol % with respect to the total amount of dicarboxylic acids or anhydrides. Treatment liquids comprising polyurethane resins obtained by reaction of polyesters diols containing aromatic polycarboxylic acids do show an improved colloidal stability and lead to images with an improved solvent resistance and an improved dry and wet scratch resistance. The good results obtained with terephthalic acids and isophthalic acids has probably to do with obtaining a certain amount of crystallinity of the polyurethane resin or providing linear amorphous chains which contribute more to the desired physical properties such as scratch resistance and solvent resistance. Introducing phthalic acid anhydride or isophthalic acid in terephthalic acid based polyesters reduces the crystallinity or chain end-to-end distance and improves the solubility in organic solvents. For terephthalic acid based polyester diols, it is preferred to use copolymers of terephthalic acid with isophthalic acid, more preferably having at least 20 mol % isophthalic acid. For the same reason polyester diols with only phthalic acid anhydride are less preferred than copolymers where terephthalic acid is incorporated. Polyester diols based on only phthalic acid anhydride could be very soluble in the polymerization solvent for the PU preparation, but a dried coating will have also a lower solvent resistance. Therefore, it is preferred that the aromatic polyester diol contains between 20 and 80 mol % of terephthalate groups on the basis of the total amount of dicarboxylic acids (or acid anhydrides) in the polyester diol.

Very suitable polyester diols containing terephthalic ester units and isophthalic ester units in a ratio of 1:1 mol % are: Dynacoll 7150 supplied by Evonik, Marl, Germany, Vylon 220 from Toyobo, Osaka Japan and Elitel 1401 obtained from Unitika Ltd Dusseldorf Germany.

In order to obtain the desired properties of the polyester diol and using a high content of terephthalic acid, one could use also a mixture of dicarboxylic acids. For example, to reduce the crystallinity one could use a mixture of terephthalic acid and adipic acid. Consequently, one could use also polyester dials based on a mixture of aromatic polycarboxylic acids and aliphatic dicarboxylic acids such as adipic acid, succinic acid, methylcyclohexene tricarboxylic acid, fumaric acid and sebacic acid or anhydrides such as tetrahydrophthalic acid anhydride, hexahydrophthalic acid anhydride, maleic acid anhydride and succinic acid anhydride.

Specific examples of the polyol component for the making of polyester dials include dials such as ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanedial; and tri- or higher-valent polyols such as glycerin, trimethylolethane, trimethylolpropane and pentaerythritol. For the polyol component, dials as mentioned above are mainly used, and if necessary, tri- or higher-valent polyols such as glycerin, trimethylolethane, trimethylolpropane and pentaerythritol can be further used in combination with the dials. Aromatic dials can also be used to increase the content of aromatic moieties in the polyester polyol. Suitable aromatic dials are: p-xylene glycol, 1,5-naphthalenedimethanol, 1,4-naphthalenedimethanol, 4,4'-bis(hydroxymethyl)biphenyl, bis(hydroxyethyl) terephthalate, bis(2-hydroxypropyl) terephthalate, 1,5-naphthalenedicarboxylic acid 1,5-bis(2-hydroxyethyl) ester, 4,4-bis(hydroxymethyl) diphenylmethane, 2,2-bis(4-β-hydroxyethoxyphenyl)propane (diethoxylated bisphenol A) and bis[p-(2-hydroxyethoxy)phenyl]methane.

Besides the polyester dials, other different polymeric dials can be used for example to adjust the physical properties, adhesion, mechanical performance, etc. Examples are e.g. polycarbonate dials, polyether dials, polyacrylate dials, aliphatic polyester dials, polyolefin dials or other polymeric dials. Examples of polycarbonate dials are e.g. Oxymer C112, Oxymer M112 (available via Perstorp), Kuraray polyol C-2050, C-2090, C-1090 (available from Kuraray), Converge HMA-1 and Converge HMA-1 (available from Novomer Inc.), Duranol T6002, T6001, T5652, T5651, T5650J, T4672, T4671, T4692 and T4691 (available from Asahi kasei). Additional aliphatic polyester dials, are e.g. regular (semi)crystalline or amorphous grades, e.g. based on hexane dial adipates (e.g. Dynacoll 7372 from Evonik) but also polyester diols based on natural products such as polyester diols made by using dimer acid or dimer diols (e.g. trade name Priplast from Croda), examples are Priplast 3192 and Priplast 1838. The raw material used to prepare certain Priplast grades, i.e. dimer dials with trade name Pripol can also be used as monomer in the PU synthesis to modify the physical properties and adhesive properties.

A.1.5. Hydroxy Functional Monomers

During the reaction between the polyol comprising a cationic group, the polyether polyol and the polyisocyanate, hydroxy functional monomers can be present.

Preferred monohydroxy monomers include: Pentaerythritol, triacrylate, hydroxybutyl acrylate, 6-Hydroxyhexyl acrylate, 3-Hydroxypropyl acrylate, Dipentaerythritol pentaacrylate, 3-Acryloyloxy-2-hydroxypropyl methacrylate, 1,1,1-Tris(hydroxymethyl)propane diacrylate, 2-(2-Hydroxyethoxy)ethyl acrylate, 2-Hydroxy-1,3-dimethacryloxypropane, N-(3-Hydroxypropyl)acrylamide, (2-Hydroxyethyl)acrylamide, 3-Dimethylamino-2-hydroxypropyl methacrylate.

Preferred Dihydroxy compounds include: Pentaerythritol diacrylate, Pentaerythritol, dimethacrylate, 1,4-Butanediol diglycidyl ether diacrylate, Bisphenol A bis(2-hydroxy-3-methacryloxypropyl) ether, 2,3-Hydroxypropyl acrylate, Ethylene glycol diglycidyl ether dimethacrylate, Diethylene glycol diglycidyl ether diacrylate, Trimethylolpropane monoacrylate, Trimethylolethane monomethacrylate, Trimethylolethane monoacrylate A.2. Reaction Conditions With regard to the conditions for the reaction between the polyol containing a cationic group, the polyether polyol, the polymeric diol and the polyisocyanate compound, conventionally used reaction conditions can be used without particular limitation.

In the reaction between the polyol containing a cationic group, the polyether polyol, the polymeric diol and the polyisocyanate compound, if necessary, a did with Mw equal to or less than 400 can be used. Examples of suitable diols are: ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanediol; and tri- or higher-valent polyols such as glycerin, trimethylolethane, trimethylolpropane and pentaerythritol. 1,4-butane diol is most preferred.

If a polyester dial is used in the reaction, the stabilizing polyols and the polyester diol (Mw>400 g/mol) are reacted with in excess of isocyanate. This enables a good conversion of the reaction. After reacting using an excess of isocyanate, the excess is compensated to a NCO/OH molar ratio by addition of a low molecular weight diol, which would lead to a polyurethane resin with very low amount of residual isocyanate. In case some residual isocyanate is present some urea bonds could be formed. Examples of suitable diols are given above.

Examples of the organic solvent used for the reaction between the polyether diol, the polyol comprising a cationic group, the polymeric dial and the organic polyisocyanate compound, here include ketones such as acetone and methyl ethyl ketone, ethers such as tetrahydrofuran and dioxane, acetates such as ethyl acetate and butyl acetate, nitriles such as acetonitrile, and amides such as dimethyl formamide, N-methylpyrrolidone and N-ethylpyrrolidone. These may be used singly or in combinations of two or more.

Using higher molecular weight polyether polyols than Ymer120N will give more phase separation, providing a better water dispersibility. However, for the making of the polyurethane resin, it is more difficult to dissolve these polyols in de organic solvent, e.g. acetone. Also some polymeric polyols might have a poor solubility in acetone. This can be overcome by using a co-solvent during the polycondensation reaction. A preferred co-solvent is 2-pyrolidon, 2,5,7,10-tetraoxaundecane (TOU), 1,3-dioxolane, 1-(2-Butoxy-1-methylethoxy)-2-propanol (solvenol DPnB) or 1 (or 2)-(2-Butoxymethylethoxy)propanol (Dowanol DPnB), butyldiglycol, N,N-dimethyl lactamide, 3-methoxy N,N-dimethylpropionamide, 3-methoxy-3-methyl-1-butanol (MMB), alpha-methyl-gamma-butyrolactone (MBL), N-Butylpyrrolidone (e.g. Tamisolve NXG), N-ethylpyrrolidone or N-methylpyrrolidone, more preferably 2-pyrolidon or N-methylpyrrolidone, more preferably 2-pyrolidon.

The aqueous polyurethane dispersion of the invention contains the polyurethane resin having a cationic group in the main chain or a side chain and a polyalkylene oxide side chain. Therefore, the obtained polyurethane resin is preferably dispersed in water to obtain an aqueous dispersion of the polyurethane resin. Every dispersing technology suitable for preparing an aqueous dispersion may be used. After being dispersed in an aqueous medium, the organic solvents wherein the reaction took place, can be removed using standard separation techniques such as distillation.

B. Aqueous Treatment Liquid

The aqueous treatment liquid according to the present invention contains the polyurethane resin dispersion as described in § A.1. and water and is suitable for treating substrates for printing applications, more specifically inkjet printing applications. Additional components which may be added to the treatment liquid are given below. The amount of polyurethane resin in the treatment liquid is equal to or lower than 30 wt. % with respect to the total weight of the liquid.

B.1. Water Soluble Organic Solvent.

The treatment liquid of the invention may contain, besides water as a solvent, also a water-soluble organic solvent. Examples of water-soluble organic solvents include polyhydric alcohols such as diethylene glycol, triethylene glycol, dipropylene glycol, 1,3-propanediol, 1,3-butanediol, 1,2,3-Trihydroxypropane (glycerol), 1,4-butanediol, 2,2-dimethyl-1,3-propanediol, 2-methyl-1, 3-propanediol, 1,2-pentanediol, 2,4-pentanediol, 1,5-pentanediol, 1,6-hexanediol, 2-ethyl-1,3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone or N-ethylpyrrolidone.

Other preferred water soluble organic solvents include ethylene glycol, propylene glycol, 1,2-butanediol, 2,3-butanediol, 2-methyl-2,4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether, 2,5,7,10-tetraoxaundecane (TOU), 1,3-dioxolane, 1-(2-Butoxy-1-methylethoxy)-2-propanol (solvenol DPnB) or 1 (or 2)-(2-Butoxymethylethoxy)propanol (Dowanol DPnB), butyldiglycol, N,N-dimethyl lactamide, 3-methoxy N,N-dimethylpropionamide, 3-methoxy-3-methyl-1-butanol (MMB) and alpha-methyl-gamma-butyrolactone (MBL).

The content of the water-soluble organic solvent, in the treatment liquid is preferably less than 70 wt. %. If the content exceeds 70% by mass, the treatment liquid loses its water based, hence more green character.

B.2. Surfactant

In the treatment liquid of the present invention, a surfactant may be added in order to ensure wettability onto the substrate. The amount of the surfactant added is preferably 0.1 wt. % to 5 wt. % as an active component in the ink.

If the amount added is below 0.1% by mass, wettability onto the substrate is not sufficient and causes degradation in image quality and in adhesion to the substrate. The surfactant that can be used is not particularly limited as long as it satisfies the above limitation.

While any of an amphoteric surfactant, a non-ionic surfactant, or a cationic surfactant can be used, non-ionic surfactants such as polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability and image quality. In addition, a fluorine-based surfactant and a silicon-based surfactant can be used in combination (or singly) depending on formulation.

Suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air Products.

B.3. Additives

Together with the polyurethane resin, a multivalent metal ion can be contained in the treatment liquid. Suitable examples are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating ink by acting on anionic groups such as the carboxyl groups on the surface of the pigment or the dispersed polymer of capsules contained in the ink. As a result, the ink remains on the surface of the substrate to improve the colour-developing property. Therefore, it is preferred that the surface of the pigment in the ink and/or the dispersed polymer of the capsules contained in the ink have an anionic group selected from the group of carboxyl group, sulfonate group and phosphonate group, most preferably carboxyl group.

The treatment liquid may also contain organic acids. Preferred examples of the organic acids include, but are not limited to acetic acid, propionic acid, and lactic acid.

The treatment liquid may also contain colorants, such as pigments. Particularly useful for printing on dark substrates is a treatment liquid containing a white pigment. The preferred pigment for the aqueous treatment liquid ink is titanium dioxide or calcium carbonate. Titanium dioxide ($TiO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully setforth.

The titanium dioxide particles can have a wide variety of average particle sizes of about 1 micron or less, depending on the desired end use application of the treatment liquid. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

In addition, unique advantages may be realized with multiple particle sizes, such as opaqueness and UV protection. These multiple sizes can be achieved by adding both a pigmentary and a nano grade of $TiO_2$.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photo-reactivity of the titanium dioxide. Metal oxide coatings of alumina, aluminasilica, boria and zirconia result in a positive charged surface of the $TiO_2$ pigments and hence are particularly useful in combination with the cationic polyurethane resin of the invention or with stabilised capsules because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan). Other suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Commercial examples of $CaCO_3$ particles are Socal UP from Solvay, Viscoexcel-30 and Hakuenda CCR-S from Omya International AG. These grades have all rather small particle size.

C. Aqueous Inkjet Ink

The aqueous polyurethane resin dispersion according to the invention can be incorporated in an aqueous inkjet ink. Preferably, the colorants included in the inkjet ink according to the invention are pigments, more preferably the surface of the pigments is positively charged to avoid aggregation between the polyurethane resin and the pigment.

To obtain a positively charged pigment surface in an aqueous ink formulation, the pigments may be dispersed in an aqueous medium with a dispersing agent according Formula IV

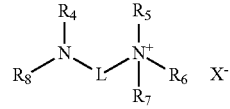

Formula IV wherein
  $R_4$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group
  L represents a divalent linking group comprising 2 to 10 carbon atoms $R_5$, $R_6$ and $R_7$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group
  $R_8$ represent a hydrocarbon group comprising at least 8 carbon atoms Any of $R_4$, $R_5$, $R_6$, $R_7$ and L may represent the necessary atoms to form a five to eight membered ring X— represents an anion to compensate the positive charge of the ammonium group.

In a preferred embodiment, $R_8$ represents a substituted or unsubstituted alkyl group, comprising at least 8 carbon atoms, more preferably at least 10 carbon atoms and most preferably at least 12 carbon atoms. In a particularly preferred embodiment, $R_8$ represents an unsubstituted alkyl group comprising at least 10 carbon atoms. In another preferred embodiment, R4 is selected from the group consisting of a hydrogen and a substituted or unsubstituted alkyl group, a hydrogen and a C1 to C6 unsubstituted alkyl group being more preferred, a hydrogen being the most preferred. In a further preferred embodiment, L represents a divalent linking group comprising 2 to 8 carbon atoms, 2 to 6 carbon atoms being more preferred. In another preferred embodiment, $R_5$, $R_8$ and $R_7$ independently represent a substituted or unsubstituted alkyl group, a C1 to C6 unsubstituted alkyl group being more preferred, a methyl, an ethyl and a propyl group being the most preferred.

Typical dispersing agents, according to Formula IV are given in Table 1 of the unpublished patent application: PCT/EP2018/082468.

The pigment of the dispersion according to the invention can be any pigment but is preferably a colored pigment. Examples include, but are not limited to, carbon black, and colored pigments such as anthraquinones, phthalocyanine, blues, phthalocyanine greens, diazos, monoazos, pyranthrones, perylenes, heterocyclic yellows, quinacridones, diketo-pyrrolo-pyrrolo pigments and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellow include Pigment Yellow 117 and Pigment Yellow 138.

More preferably the pigment is selected from the groups of quinacridones and diketo-pyrrolo-pyrrolo pigments. Particularly preferred pigments are selected from the group consisting of Pigment Red 122, Pigment Violet 19 and mixed crystals of the above particular pigments. A commercially available example is Cinquasia Magenta RT-355-D from Ciba Specialty Chemicals. Examples of other suitable colored pigments are described in Colour Index, $3^{rd}$ edition (The Society of Dyers and Cikiyrusts, 1982).

Particularly useful for printing on dark textile is an aqueous inkjet ink containing the dispersion of the invention having a white pigment as pigment. The preferred pigment is titanium dioxide. See § B.3.

In the pigment dispersion, it is desirable that the average particle diameter of the pigment particles be in the range of 0.01 to 1 μm, more preferably in the range of 0.01 to 0.5 μm, most preferably in the range of 0.01 to 0.2 μm. When the average particle diameter of the pigment particles is 0.2 μm or less, the problems concerning the reliability such as clogging of the nozzle and the storage stability of the ink composition can be effectively minimized. When the average particle diameter of the pigment particles is 0.01 μm or more, the advantages of the pigments for use in the present invention, ie., excellent light resistance and water resistance can be effectively exhibited, and aggregation of pigment particles can be prevented.

The pigment to dispersing agent ratio (by wt.) is preferably, from about 0.7 to about 3.2, more preferably, from about 1.0 to about 2.8 and most preferably from about 1.8 to about 2.4.

For dispersing the pigments, a variety of dispersion apparatus, for example, a ball mill, sand mill, roll mill, colloid mill, ultrasonic homogenizer, and high-pressure homogenizer can be employed. Using any of the abovementioned dispersion apparatus, a pigment and water serving as a solvent are mixed and dispersed, with the addition thereto of the dispersing agent as described above thereby obtaining the pigment dispersion of the invention. The whole amount or partial amount of the dispersing agent is preferably added during the dispersing step.

The pigment dispersion may contain up to 75 (wt.)% pigment, but will generally be in the range of approximately 0.1 to 30 (wt.)%, preferably 0.1 to 15 (wt.)%, more preferably from 0.1 to 10 (wt.)%. When the amount ratio of the pigment is 0.1 wt. % or more, sufficient saturation and image density can be obtained. When the amount ratio of the pigment is 30 wt. % or less, a decrease in color value can be prevented and the nozzles of a print head can be prevented from being clogged.

Besides a pigment, the inkjet ink according to the invention may also comprise a water-soluble organic solvent and/or a surfactant. Preferred candidates for water-soluble organic solvents are disclosed in § B.1. Preferred candidates for surfactants are disclosed in § B.2.

D. Application Method of the Treatment Liquid

The treatment liquid according to the present invention is suitable for treating different substrates, porous and non-porous ones. The liquid is then also called a pre-treatment liquid. Porous substrates include paper, card board, white lined chipboard, corrugated board, packaging board, wood, ceramics, stone, leather and textile. Non-porous substrates include metal, synthetic leather, glass, polypropylene, polyvinylchloride, PET, polylactic acid (PLA), (co)polyesters based on cyclohexyldimethanol (CHDM)=PETG, (co)polyesters based on 2,5-furandicarboxylic acid (FDCA), copolyesters based on isosorbide, e.g. copolymers of terephthalic acid and ethylene glycol and isosorbide, PMMA, polycarbonate, polyamide, polystyrene or co-polymers thereof. The treatment liquid according to the present invention is also suitable for treating jetted images, commonly known as post treatment fluid.

All well-known conventional methods can be used for coating or impregnating the treatment liquid on a substrate or on an image formed by jetting an aqueous inkjet ink. Examples of the method include air knife coating, blade coating, roll coating, gravure coating. After applying the treatment liquid onto a substrate, the coating is preferably dried before printing the image onto the treated substrate.

The treatment liquid is particularly suitable for treating non-porous substrates, before or after printing images with inkjet printing.

The treatment liquid is also suitable for treating textile fabrics. The textile fabric used is made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the above-mentioned fibres. The treatment liquid containing the polyurethane resin according to the invention can be preferably applied to the fabric by spraying, coating, padding or pad printing. Alternatively, the treatment liquid may also be applied to the fabric using an ink jet head or valve jet head. This means of applying the treatment liquid has the advantage that the amount of required treatment liquid is substantially lower than with the other application methods. By means of a jetting head, it is possible to apply treatment liquid onto areas of the fabric where the image should be printed. Suitable ink jet head types for applying the treatment liquid are piezoelectric type, continuous type, thermal print head type or valve jet type.

Fabric to which the treatment liquid has been applied may be dried and optionally undergo a heat treatment, before the subsequent ink jetting step with the pigment containing ink. Examples of the heating process include, but are not limited to, heat press, atmospheric steaming, high-pressure steaming, and THERMOFIX. Any heat source can be used for the heating process; for example, an infrared ray lamp is employed.

In another preferred embodiment of the invention, the treatment liquid, after having been applied onto a substrate, is not substantially dried before the image is printed by means of the jetting of the aqueous ink jetting step.

EXAMPLES

1. Measurements 1.1 Particle Size Measurement

Samples of the PU dispersion were diluted 10 times with deionized water and 0.005M NaCl (aq.) respectively. A diluted PU dispersion of 1.0 mL was brought in a disposable polystyrene cuvette (DTS0012), and its z-average particle size was measured with Malvern Zetasizer Nano S 3 times at 23° C. after 30 seconds of stabilization time.

1.2. Zeta Potential

Samples of the PU dispersion were diluted 20 times with 0.005 M KCl (aq.). The diluted PU dispersion was brought in a DTS1070 measuring cell and its static zeta-potential (mV) was measured 3 times with Malvern Zetasizer Nano ZS at 22° C. after 2 minutes of stabilization time.

2. Materials

All materials used in the following examples were readily available from standard sources such as Sigma-Aldrich (Belgium) and Acros (Belgium) unless otherwise specified. The water used was demineralised water.

Acetone is acetone p.a. supplied by VWR International

Dynacoll 7150 is a polyester diol supplied by Evonik

Vylon 220 is a polyester polyol containing terephthalic ester and isophthalic ester units obtained from Toyobo Ymer N120 is 1,3 diol polyether supplied by Perstorp Reaxis is C708 is a catalyst supplied by Reaxis BV, The Netherlands Genocure DEA is 2,2'-(methylimino)diethanol supplied by Rahn AG DHEPT is N,N-Dihydroxyethyl-p-toluidin and available via Saltigo DBTL is dibutyl tin laurate (KEVER-KAT DBTL 162) supplied by Brenntag IPDI is Desmodur I, an isocyanate supplied by Covestro BD is 1,4-butane diol supplied by Acros Triethylamine is triethylamine supplied by Acros Benzyl bromide is supplied by TCI P-8: dodecyl(benzyl)diethanolammonium chloride supplied by Sachem under the tradename BEXOC P-12: N,N-bis(2-hydroxyethyl)-N-methyl-benzenemethanaminium bromide was synthesised as follows:
In a 250 mL three-necked round-bottom flask 5.96 g of N-methyliminodiethanol was dissolved in 50 mL of anhydrous acetonitrile placed in an ice cooling bath under a continuous flow of nitrogen. A solution of 8.99 g of benzyl bromide in 50 mL of acetonitrile was added dropwise to the reaction solution via an addition funnel. The reaction solution was stirred at ambient temperature during 16 hours. Upon completion the reaction mixture was washed with a mixture of n-hexane and dichloromethane in a ratio of 1:1 and filtered. The residue was dried over 48 hours in an oven at 40° C. under reduced pressure to obtain a desired product in 96% yield (13.92 g, white solid).

P-20: Bromine salt of N-(2,3-dihydroxypropyl)-N,N-dimethyl-1-dodecanaminium was synthesized as follows:
In a 500 mL three-necked round-bottom flask equipped with a coiled condenser 8.82 g of 3-(dimethylamino)-1,2-propanediol was dissolved in 180 mL of anhydrous acetonitrile at ambient temperature under a continuous flow of nitrogen. A solution of 20.19 g of 1-bromododecane in 30 mL of anhydrous acetonitrile was further added. The reaction solution was stirred during 18 hours at 70° C. Upon completion the reaction solvent was removed by rotary vacuum evaporation under reduced pressure. The crude residue was precipitated with cold ethyl acetate in an ice cooling bath. The precipitate was filtered and dried over 48 hours in an oven at 35° C. under reduced pressure to obtain a desired product in 91.7% yield (25.00 g, white solid).

P-21: N-Methyl-N-n-dodecyl-N,N-di(hydroxyethyl)ammonium bromide was synthesized as follows: In a 500 mL three-necked round-bottom flask equipped with a coiled condenser 7.15 g of N-methyliminodiethanol was dissolved in 120 mL of anhydrous acetonitrile at ambient temperature under a continuous flow of nitrogen. A solution of 17.94 g of 1-bromododecane in 30 mL of anhydrous acetonitrile was further added. The reaction solution was stirred during 24 hours at 75° C. Upon completion, the reaction mixture was precipitated in an ice cooling bath. The precipitate was washed with cold ethyl acetate and filtered. The residue was dried over 48 hours in an oven at 35° C. under reduced pressure to obtain a desired product in 69% yield (15,25 g, white solid).

3. Synthesis of PU-Resins According to the Invention

PU-I1

In an Erlenmeyer of 500 mL 103.88 g of Dynacoll 7150 and 94.92 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 15.25 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, 11.20 g of P-8 was dissolved in 86.46 g of acetonitrile placed in an oil bath at 65° C. under a continuous flow of nitrogen during 30 minutes. While the cationic diol dissolved in acetonitrile the mixture of Dynacoll and Ymer was added dropwise to the reaction solution via an addition funnel. The reaction solution was slightly turbid in the beginning and became clear while adding the polyol mixture at 65° C. during 30 minutes. After the addition of the diol and polyol the funnel was flushed with 15.82 g of acetone. A solution of 1.07 g of Reaxis C708 in 7.91 g of acetone was further added to the reaction mixture. Subsequently the isocyanate was added dropwise via an addition funnel with pressure equalization arm during 20 minutes. For this experiment 27.84 g of IPDI was used. The amount of isocyanate is in excess towards the hydroxyl amount, ie. NCO/OH=1.53. After adding IDPI the addition funnel was flushed with 7.91 g of acetone, and the reaction mixture was stirred at 65° C. during 2 hours. Subsequently a solution of 3.91 g of 1,4-butane diol in 3.92 g of acetone was added. The reaction mixture was reacted over 20 hours at 55° C. and then heated at 65° C. during 1 hour in order to reach full conversion.

352.50 g (43.19 wt. % solids) of the reaction mixture was weighed in a stainless steel. Subsequently the water based dispersion was made by using Disperlux equipment through adding water during high shear mixing. Under stirring at 1000 RPM using a 5 cm diameter dissolver stirrer 281.31 g of water was added to the PU solution during 20 minutes. The mixture was further stirred during 30 minutes under stirring at 900 RPM to obtain 548.00 g of a viscous dispersion, which was transferred into a 2 L round bottom flask. The volatile solvent (acetonitrile and acetone) was removed from the dispersion at 40° C. by rotary vacuum evaporation under reduced pressure. The evaporation was started at a pressure of 400 mbar and decreased the pressure gradually till 60 mbar to obtain 409.20 g of a viscous dispersion. The amount of the evaporated water was estimated, and 23.60 g of demineralized water was added to the viscous dispersion to obtain a 35 wt. % dispersion. The solids content was measured of the resulting dispersion, ie. 36.20 wt. %. The pH of the obtained dispersion is 5.58. The average particle size in a Malvern particle sizer measured is 22.53 nm.

PU-I2

In an Erlenmeyer of 500 mL 105.91 g of Dynacoll 7150 and 94.92 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 15.55 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, 8.31 g of P-12 was dissolved in 86.46 g of acetonitrile placed in an oil bath at 60° C. under a continuous flow of nitrogen during 30 minutes. While the cationic diol dissolved in acetonitrile the mixture of Dynacoll and Ymer was added dropwise to the reaction solution via an addition funnel. The reaction solution (kept at 60° C.) was slightly turbid in the beginning and became clear while adding the polyol mixture at 65° C. during 30 minutes. After the addition of the diol and polyol the funnel was flushed with 15.82 g of acetone. A solution of 1.07 g of Reaxis C708 in 7.91 g of acetone was further added to the reaction mixture. Subsequently the isocyanate was added dropwise via an addition funnel with pressure equalization arm during 20 minutes. For this experiment 27.84 g of IPDI was used. The amount of isocyanate is in excess towards the hydroxyl amount, ie. NCO/OH=1.53. After adding IDPI the addition funnel was flushed with 7.91 g of acetone, and the reaction mixture was stirred at 65° C. during 2 hours. Subsequently a solution of 3.91 g of 1,4-butane diol in 3.92 g of acetone was added. The reaction mixture was reacted over 20 hours at 48° C. and then heated at 55° C. during 1 hour in order to reach full conversion.

334.30 g (43.19 wt. % solids) of the reaction mixture was weighed in a stainless steel. Subsequently the water based dispersion was made by using Disperlux equipment through adding water during high shear mixing. Under stirring at 1000 RPM using a 5 cm diameter dissolver stirrer 266.86 g of water was added to the PU solution during 20 minutes. The mixture was further stirred during 30 minutes under stirring at 900 RPM to obtain 534.30 g of a viscous dispersion. The dispersion was transferred to a 2 L round bottom flask and after the removal of acetonitrile and acetone from the dispersion at 40° C. by rotary vacuum evaporation under reduced pressure, 365.80 g of a viscous dispersion was obtained. The evaporation was started at a pressure of 400 mbar and decreased the pressure gradually till 60 mbar. The amount of the evaporated water was estimated, and 44.80 g of demineralized water to the viscous dispersion was added to obtain a 35 wt % dispersion. The solids content was measured of the resulting dispersion, ie. 36.46 wt %. The pH of the obtained dispersion is 5.82. The average particle size in a Malvern particle sizer measured is 45.66 nm.

PU-I3

In an Erlenmeyer of 500 mL 104.45 g of Dynacoll 7150 and 94.92 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 15.33 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, 10.39 g of P-21 was dissolved in 86.46 g of acetonitrile placed in an oil bath at 60° C. under a continuous flow of nitrogen during 30 minutes. While the cationic dial dissolved in acetonitrile the mixture of Dynacoll and Ymer was added dropwise to the reaction solution via an addition funnel. The reaction solution at 60° C. was slightly turbid in the beginning and became clear while adding the polyol mixture during 30 minutes. After the addition of polyols, the funnel was flushed with 15.68 g of acetone. A solution of 1.07 g of Reaxis C708 in 7.91 g of acetone was further added to the reaction mixture. Subsequently 28.00 g of IPDI was added dropwise via an addition funnel with pressure equalization arm during 20 minutes. The amount of isocyanate is in excess towards the hydroxyl amount, ie. NCO/OH=1.53. After adding IDPI the addition funnel was flushed with 7.91 g of acetone, and the reaction mixture was stirred at 55° C. during 2 hours. Subsequently a solution of 3.93 g of 1,4-butane diol in 3.92 g of acetone was added. The reaction mixture was reacted over 20 hours at 48° C. and then heated at 55° C. during 1 hour in order to reach full conversion.

342.20 g (43.19% solids) of the reaction mixture was weighed in a stainless steel vessel. Subsequently the water based dispersion was made by using Disperlux equipment through adding water during high shear mixing. Under stirring at 900 RPM using a 5 cm diameter dissolver stirrer 273.11 g of water was added to the PU solution during 20 minutes. The mixture was further stirred during 30 minutes under stirring at 900 RPM to obtained 536.90 g of a viscous dispersion, which was transferred to a 2 L round bottom flask. Subsequently after the removal of acetonitrile and acetone from the dispersion at 40° C. by rotary vacuum evaporation under reduced pressure, 370.90 g of a viscous dispersion was obtained. The evaporation was started at a pressure of 400 mbar and the pressure was gradually decreased till 60 mbar. The amount of the evaporated water was estimated, and 49.30 g of demineralized water was added to the viscous dispersion to obtain a 35 wt. % dispersion. The solids content was measured of the resulting dispersion, ie. 37.33 wt. %. The pH of the obtained dispersion is 5.86. The average particle size in a Malvern particle sizer measured is 44.76 nm.

PU-I4

In an Erlenmeyer of 500 mL 104.45 g of Dynacoll 7150 and 94.92 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 15.33 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, 10.39 g of P-20 was dissolved in 86.46 g of acetonitrile placed in an oil bath at 60° C. under a continuous flow of nitrogen during 30 minutes. While the cationic diol dissolved in acetonitrile the mixture of Dynacoll and Ymer was added to the reaction solution via an addition funnel. The reaction solution was slightly turbid in the beginning and became clear while adding the polyol mixture at 60° C. during 30 minutes. After the addition of polyols the funnel was flushed with 15.82 g of acetone. A solution of 1.07 g of Reaxis C708 in 7.91 g of acetone was further added to the reaction mixture. Subsequently the isocyanate was added dropwise via an addition funnel with pressure equalization arm during 20 minutes. For this experiment 28.00 g of IPDI was used. The amount of isocyanate is in excess towards the hydroxyl amount, ie. NCO/OH=1.53. After adding IDPI the addition funnel was flushed with 7.91 g of acetone, and the reaction mixture was stirred at 55° C. during 2 hours. Subsequently a solution of 3.93 g of 1,4-butane diol in 3.92 g of acetone was added. The reaction mixture was reacted over 20 hours at 48° C. and then heated at 55° C. during 1 hour in order to reach full conversion. 347.70 g (43.19% solids) of the reaction mixture was weighed in a stainless steel vessel.

Subsequently the water based dispersion was made by using Disperlux equipment through adding water during high shear mixing. Under stirring at 1000 RPM using a 5 cm diameter dissolver stirrer 277.50 g of water was added to the PU solution during 20 minutes. The mixture was further stirred during 30 minutes under stirring at 800 RPM to obtained 540.90 g of a viscous dispersion. Subsequently 375.10 g of a viscous dispersion was obtained after the removal of acetonitrile and acetone from the dispersion at 40° C. by rotary vacuum evaporation under reduced pressure. The evaporation was started at a pressure of 400 mbar and decreased the pressure gradually till 60 mbar. The amount of the evaporated water was estimated and 51.80 g of demineralized water was added to the viscous dispersion to obtain a 35 wt % dispersion. The solids content was measured of the resulting dispersion, ie. 35.75 wt %. The pH of the obtained dispersion is 5.59. The average particle is 31.70 nm.

4. Synthesis of the Comparative PU Dispersions

First of all, it was tried to make a polyurethane dispersion with a quaternized ammonium diol having a lower ratio of number of carbon atoms making up the carbon chains between the cationic charged atom and a hetero atom or the end of the carbon chain over charge than 12. Therefore, N,N-bis(2-hydroxyethyl)dimethyl ammonium chloride was selected. However the making of the PU-dispersion failed as this monomer was not soluble in solvents like acetone, MEK or mixtures thereof.

PU-C1

In an Erlenmeyer of 500 mL 119.55 g of Dynacoll 7150 and 110.04 g of acetone were weighed. The solution of Dynacoll 7150 in acetone was vigorously stirred at room temperature during 60 minutes by using a magnetic stirrer to obtain a colorless and clear solution. The poly ether diol, Ymer N120, was preheated in an oven at 80° C. to obtain a liquid product. 17.55 g of Ymer N120 was added to the solution and stirred during 15 minutes by using a magnetic stirrer to obtain a polyol mixture which was further used in the reaction. In a 500 mL three-necked round-bottom flask equipped with a coiled condenser and an overhead stirrer, the polyol mixture and 86.46 g of acetonitrile were subsequently added under a continuous flow of nitrogen. The reaction mixture was stirred at 55° C. during 30 minutes. A solution of 1.07 g of Reaxis C708 in 7.91 g of acetone was further added to the reaction mixture. Subsequently 21.07 g of IPDI was added dropwise via an addition funnel with pressure equalization arm during 20 minutes. The amount of isocyanate is in excess towards the hydroxyl amount, ie. NCO/OH=1.53. After adding IDPI the addition funnel was flushed with 7.91 g of acetone, and the reaction mixture was stirred at 55° C. during 2 hours. Subsequently a solution of 2.96 g of 1,4-butane diol in 3.92 g of acetone was added. The reaction mixture was reacted over 20 hours at 48° C. and then heated at 55° C. during 1 hour in order to reach full conversion.

341.20 g (43.19% solids) of the reaction mixture was weighed in a stainless steel vessel. Subsequently the water based dispersion was made by using Disperlux equipment through adding water during high shear mixing. Under stirring at 900 RPM using a 5 cm diameter dissolver stirrer 271.39 g of water was added to the PU solution during 20 minutes. The emulsion was further stirred during 30 minutes under stirring at 900 RPM to obtained 514.60 g of a viscous dispersion. Subsequently 347.60 g of a viscous dispersion was obtained after the removal of acetonitrile and acetone from the emulsion at 40° C. by rotary vacuum evaporation under reduced pressure. The evaporation was started at a pressure of 400 mbar and the pressure was gradually decreased till 60 mbar. The amount of the evaporated water was estimated, and 69.90 g of demineralized water was added to the viscous dispersion to obtain a 35 wt. % dispersion. The solids content was measured of the resulting dispersion, ie. 33.73 wt. %. The pH of the obtained dispersion is 6.43. The average particle size in a Malvern particle sizer measured is 177.40 nm.

PU-C2

In an Erlenmeyer of 500 mL 121.54 g of Dynacoll 7150 and 102.30 g of acetone were weighed. The solution of Dynacoll 7150 in acetone was vigorously stirred at room temperature during 60 minutes by using a magnetic stirrer to obtain a colorless and clear solution which was further used in the reaction. In a 500 mL three-necked round-bottom flask equipped with a coiled condenser and an overhead stirrer, 11.43 g of P-8 was dissolved in 78.60 g of acetonitrile placed in an oil bath at 55° C. under a continuous flow of nitrogen during 30 minutes. While the cationic diol dissolved in acetonitrile the solution of Dynacoll was added dropwise to the reaction solution via an addition funnel. The reaction solution held at 55° C. was slightly turbid in the beginning and became clear while adding the polyol mixture at 65° C. during 30 minutes. After the addition of polyol the funnel was flushed with 15.82 g of acetone. A solution of 1.07 g of Reaxis C708 in 7.91 g of acetone was further added to the reaction mixture. Subsequently 25.20 g of IPDI was added dropwise via an addition funnel with pressure equalization arm during 20 minutes. The amount of isocyanate is in excess towards the hydroxyl amount, ie. NCO/OH=1.53. After adding IDPI the addition funnel was flushed with 7.86 g of acetonitrile, and the reaction mixture was stirred at 65° C. during 2 hours. Subsequently a solution of 3.54 g of 1,4-butane diol in 3.92 g of acetone was added. The reaction mixture was reacted over 20 hours at 48° C. and then heated at 55° C. during 1 hour in order to reach full conversion.

313.80 g (43.19% solids) of the reaction mixture was weighed in a stainless steel vessel. Subsequently the water based dispersion was made by using Disperlux equipment through adding water during high shear mixing. Under stirring at 1000 RPM using a 5 cm diameter dissolver stirrer 250.10 g of water was added to the PU solution during 20 minutes.

The desired dispersion could not be obtained because of coagulation and de-stabilisation during mixing. This experiment shows that a mixed stabilization (cationic/non-ionic) is required for preparing the PU dispersions using quaternary amine diols.

PU-C3

In an Erlenmeyer of 500 ml the following compounds were weighed: 104.22 g of Vylon 220, 15.30 g of Ymer N120, and 201.45 g of acetone. The Ymer N120 was preheated in an oven at 80° C., in order to obtain a liquid which can be easily handled. The mixture weighed in the Erlenmeyer was stirred using a magnetic stirrer and heated to 45° C. A clear solution was obtained and cooled to room temperature which will be later on used in the reaction. In a 500 ml 3 necked round bottom flask equipped with a coiled condenser and stirrer, 4.61 g of Genocure MDEA was added. The prepared polyol solution (Vylon 220+Ymer N120) was added to the Genocure MDEA in the 500 ml 3 necked round bottom flask. 1.07 g of DBTL was diluted in 9.67 g of acetone and also added to the polyol mixture. Then the reactor was heated to 55° C. during appr. 35 minutes, allowing the MDEA to dissolve homogenously. Subsequently 34.04 g of IPDI was added dropwise via an addition funnel with pressure equalization arm during 20 minutes. The amount isocyanate added was an excess towards the hydroxyl amount, ie. NCO/OH=1.53). The reaction was allowed to take place during 2 hours at 55° C. The isocyanato terminated prepolymer and free IPDI which was available in excess was then further reacted using a diol as chain extender. As diol 4.78 g of BD was used. The reaction mixture was cooled to 40° C., in order to avoid evaporation of acetone. The reaction mixture was then allowed to react overnight during 20 hours at 40° C. s in order to reach full conversion.

The tertiary amino group in the resin was protonated by adding acetic acid to the resin solution. Therefore 170.66 g of the reaction solution was weighed in a stainless steel vessel and 1.07 g of acetic acid was added to the solution to protonate the MDEA units. Subsequently a water based dispersion was made using Disperlux equipment adding water during high shear mixing. Under stirring at 900 RPM using a 9 cm diameter dissolver stirrer 139.31 g of water was added during 20 minutes to the acidified PU solution. The acetone in the obtained dispersion was evaporated on a rotary evaporator. In order to avoid foaming the evaporation was started at a lower vacuum. The evaporation was stopped when also water was evaporated at a pressure of 60 mbars and a 40° C. heating bath. Based on the weight the concentration was corrected by adding water to 35%. The obtained PU-dispersion showed an excellent colloidal stability. The exact solid content was determined by drying 1 g of solution on an aluminum dish at 130° C. during 120 minutes. The solid content obtained was 35.90%. Particle size measurement using Zetasizer: 74 nm. The measured pH is 6.02.

The results of the measurement of average particle size and zeta potential is summarized in Table 2.

TABLE 2

| Pu resin dispersion | COMP/INV | Average particle size (nm) | Zeta potential (mV) |
|---|---|---|---|
| PU-C1 | COMP | 177.40 | −6.8 |
| PU-C2 | COMP | Not measurable | Not measurable |
| PU-C3 | COMP | 74.0 | +35 |
| PU-I1 | INV | 34.80 | +29 |
| PU-I2 | INV | 45.66 | +27 |
| PU-I3 | INV | 31.70 | +26 |
| PU-I4 | INV | 44.76 | +26 |

From the results in Table 2, it can be concluded that the polyurethane resin based dispersions of the invention, show no coagulation (a particle size below 60 nm) and do show a cationic charge (positive zeta potential). This makes the resin dispersions very suitable for use in inkjet inks and pre-treatment liquids which are to be jetted by means on an inkjet head. PU-dispersions based on tertiary amino containing polyols, show the same behavior, however, the PU dispersions of the invention do not require a second step in the synthesis.

The invention claimed is:

1. An aqueous polyurethane resin dispersion, the polyurethane resin having a cationic group and a polyalkylene oxide in a side chain thereof and is obtainable by reacting a polyisocyanate with a polyether diol, with a polymeric diol selected from the group of polyester diol, polyether diol, polycarbonate diol, polyacrylate diol and polyolefin diol and with a cationic polyol selected from the group consisting of a quaternary ammonium, a quaternary phosphonium, a tertiary sulfonium, and a iodonium wherein the cationic polyol comprises at least two hydroxyl groups and has a total number of carbon atoms making up the carbon chains between the cationic charged atom and a hetero atom or end of the carbon chains of the cation over charge ratio of at least 12.

2. The aqueous polyurethane resin dispersion of claim 1, wherein the cationic polyol is according to Formula I or Formula II

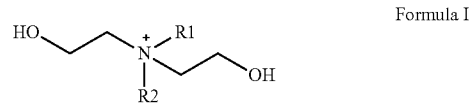

Formula I

-continued

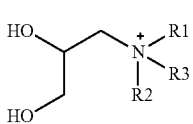

Formula II wherein
R1 and R3 are each independently a substituted alkyl or aryl group and
R2 is a substituted aryl or alkyl group having at least 7 carbon atoms or the number of carbons of R1 and R2 together is at least 8.

3. An aqueous treatment liquid for inkjet printing comprising the polyurethane resin dispersion of claim 1 in an amount of from 1 wt. % to 30 wt. % with respect to the total weight of the liquid.

4. An aqueous treatment liquid for inkjet printing comprising the polyurethane resin dispersion of claim 2 in an amount of from 1 wt. % to 30 wt. % with respect to the total weight of the liquid.

5. The aqueous treatment liquid for inkjet printing of claim 3, further comprising a pigment.

6. The aqueous treatment liquid for inkjet printing of claim 4, further comprising a pigment.

7. The aqueous treatment liquid for inkjet printing of claim 5, wherein the pigment comprises titanium dioxide.

8. The aqueous treatment liquid for inkjet printing of claim 3, further comprising a multivalent metal salt.

9. The aqueous treatment liquid for inkjet printing of claim 4, further comprising a multivalent metal salt.

10. The aqueous treatment liquid for inkjet printing of claim 7, further comprising a multivalent metal salt.

11. An aqueous inkjet ink comprising the polyurethane resin dispersion as defined in claim 1 in an amount of from 1 wt. % to 30 wt. % with respect to the total weight of the ink and a pigment dispersion, the pigment dispersion comprising at least one dispersing agent according to formula IV

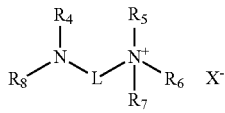

Formula IV wherein
$R_4$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted (hetero)aryl group;
L represents a divalent linking group comprising 2 to 10 carbon atoms;
$R_5$, $R_6$, and $R_7$ are each independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted (hetero)aryl group;
$R_8$ represents a hydrocarbon group comprising at least 8 carbon atoms;
$X^-$ represents an anion to compensate the positive charge of the ammonium group; and
any of $R_4$, $R_5$, $R_6$, $R_7$, and L may be combined to form a five to eight membered ring.

12. The aqueous inkjet ink of claim 11, further comprising a water soluble organic solvent.

13. An inkjet recording method, the method comprising:
(i) providing a substrate;
(ii) forming a pre-treated substrate by applying the treatment liquid of claim 3 on a surface of the substrate, optionally drying the substrate; and
(iii) printing an image by jetting an ink jet ink on the pre-treated substrate.

14. An inkjet recording method, the method comprising:
(i) providing a substrate;
(ii) forming a pre-treated substrate by applying the treatment liquid of claim 4 on a surface of the substrate, optionally drying the substrate; and
(iii) printing an image by jetting an ink jet ink on the pre-treated substrate.

15. An inkjet recording method, the method comprising:
(i) providing a substrate;
(ii) forming a pre-treated substrate by applying the treatment liquid of claim 7 on a surface of the substrate, optionally drying the substrate; and
(iii) printing an image by jetting an ink jet ink on the pre-treated substrate.

16. An inkjet recording method, the method comprising printing an image by jetting the ink jet ink of claim 11 on a substrate.

17. An inkjet recording method, the method comprising printing an image by jetting the ink jet ink of claim 12 on a substrate.

* * * * *